H. AUPERL.
TIRE ARMOR.
APPLICATION FILED JAN. 20, 1912.
1,036,776.
Patented Aug. 27, 1912.
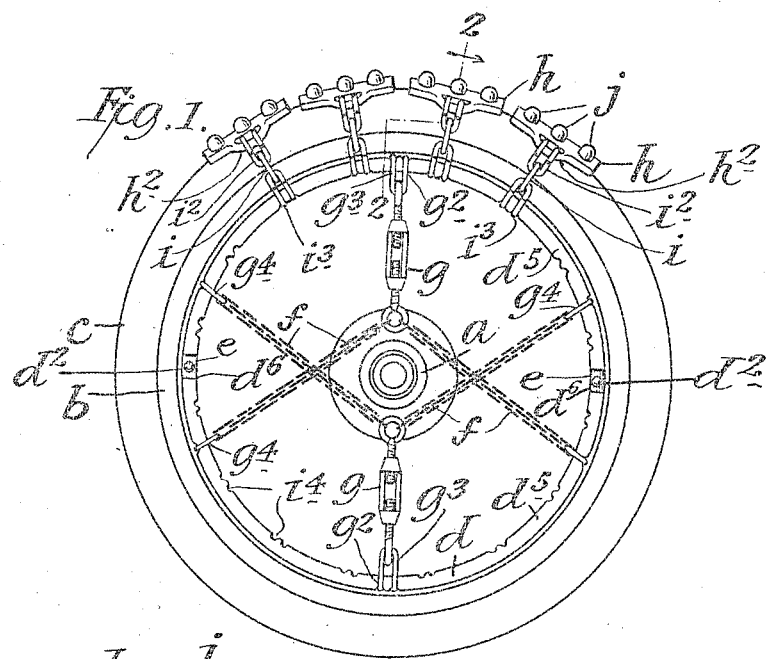
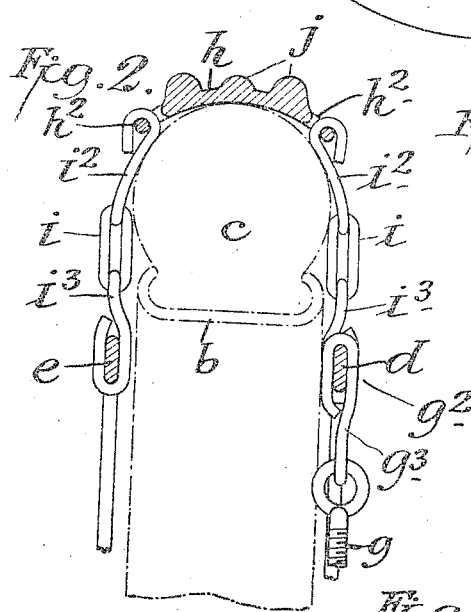
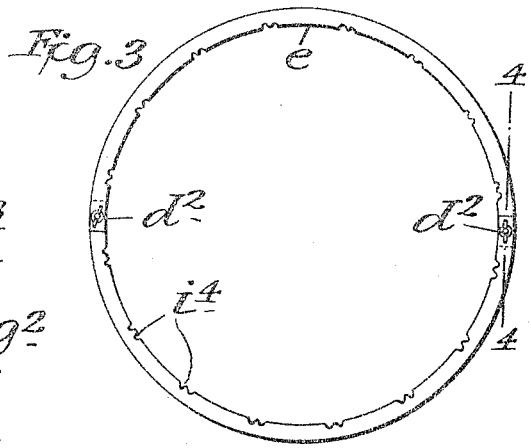
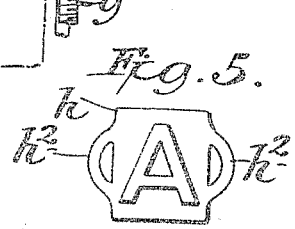
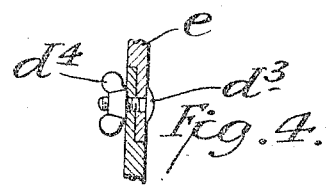
WITNESSES
INVENTOR
HARRY AUPERL
BY
Edgar Tate & Co.
ATTORNEYS

UNITED STATES PATENT OFFICE.

HARRY AUPERL, OF NEW YORK, N. Y.

TIRE-ARMOR.

1,036,776.  Specification of Letters Patent.  Patented Aug. 27, 1912.

Application filed January 20, 1912. Serial No. 672,359.

*To all whom it may concern:*

Be it known that I, HARRY AUPERL, a citizen of the United States, residing at New York, in the county of New York and State of New York, have invented certain new and useful Improvements in Tire-Armor, of which the following is a specification, such as will enable those skilled in the art to which it appertains to make and use the same.

This invention relates to pneumatic tires and particularly to anti-skidding and anti-puncture armor for tires of this class, and the object of the invention is to provide an armor of this class which can be quickly and easily applied, which will not injure the wheels in any way and which operates to completely protect the tire against puncture, and which will also prevent skidding, and, to an extent, the destruction or wear of the tire in use, and thus continue the life of the tire indefinitely or much beyond the ordinary life of such tires.

The invention is fully disclosed in the following specification of which the accompanying drawings form a part, and in which the separate parts of my improvement are designated by suitable reference characters in each of the views, and in which:—

Figure 1 is an outside view of a wheel provided with my improvement. Fig. 2 a partial cross section thereof, on the line 2—2 in Fig. 1. Fig. 3 a side view of a ring which I employ on the inner side of the wheel. Fig. 4 a section on the line 4—4 in Fig. 3. Fig. 5 an outside view of a modified form of an armor plate which I employ.

In the drawings forming part of this specification, I have shown at $a$ the hub of an ordinary automobile wheel provided with a rim $b$, a pneumatic tire $c$, and in the practice of my invention I provide a ring $d$ which is placed on the inside of the wheel and the diameter of which is preferably less than the diameter of the rim $b$, and which preferably consists of two parts connected at $d^2$ by a screw and thumb nut $d^3$ and $d^4$. I also provide a ring $d$ which is placed outside of the wheel and which is of less diameter than the rim $b$ thereof, and which consists of two separate disconnected parts $d^5$, the separate parts of said ring being separated by a space of two or three inches as shown at $d^6$ when said ring is in use. Connected with the opposite end portions of the separate parts of the ring $d$ are cross chains $f$, and connected centrally with the cross chains $f$ are turn buckle devices $g$ which are connected centrally with the separate parts of the ring $e$ at $g^2$. The turn buckle devices $g$ are connected with the separate parts of the ring $d$ by hook members $g^3$ which engage notches or recesses in the outer surfaces of said parts of said ring and the chains $f$ are connected with the separate parts of the ring $d$ by hooks $g^4$ which engage similar notches or recesses in said parts of said ring. I also provide armor plates $h$ which are approximately rectangular in form and the inner surfaces of which are concave in cross section, and said armor plates are provided on the sides thereof with loop members $h^2$ with which are connected short chains $i$, this connection being made by hooks $i^2$ and the short chain members $i$ are also connected with the rings $d$ and $e$ by means of hooks $i^3$, and said rings are provided in the inner surfaces with notches or recesses $i^4$ which are engaged by said hooks, said hooks being composed of U-shaped or loop-shaped members, and said notches or recesses being arranged in pairs. The rings $d$ and $e$ are preferably made flat or oblong in cross section so as to provide for the notches or recesses $i^4$ and for the notches or recesses on the outer surface of the ring $d$ and which receives the hooks $g^3$ by means of which the chains $f$ are connected with said ring. The armor plates $h$ are also provided on their outer surface with knobs or projections $j$ arranged in any desired manner thereon, and the object of which is to prevent skidding. In practice the armor plates $h$ are placed closely adjacent, but not in contact, and enough of said plates are employed to cover or approximately cover the outer or tread surface of the tire $c$.

The object of making the rings $d$ and $e$ of separate parts is to provide for the attachment of my improvement to a wheel without removing the wheel from the vehicle and for the detachment thereof from the wheel when necessary for any purpose.

From the foregoing description it will be seen that there is no direct connection of any of the parts of my apparatus with the wheel or the spokes or rim thereof. The entire attachment being held in place by the rings $d$ and $e$ and with the construction herein provided the armor plates $h$ will always be held in proper position, or in position for use.

In Fig. 5 of the accompanying drawings I have shown one of the armor plates $h$ provided with a raised letter of the alphabet the letter shown being $a$, and in practice each or any desired number of armor plates may be similarly provided with a letter of the alphabet, and said letters when used in this manner will prevent skidding and may also be so arranged, when the separate armor plates are secured to the tire, as to form or print in the surface over which the vehicle passes an advertisement or other subject matter; and instead of using letters of the alphabet, numerals may be employed, and in this way the vehicle as it passes over the ground or any other surface may be made to print its registered number, and this will serve, as will be understood, to identify the vehicle, or an automobile in the case of an accident or the injury of a person.

The hooks by which the chains $f$ are connected with the ring $d$ or the separate parts thereof, and the hooks by which the turn buckles $g$ are connected with said ring or the separate parts thereof, and the hooks by which the armor plates $h$ are connected with the rings $d$ and $e$ are all open hooks and are clenched after the desired connections are made and this is also true of the hooks by which the short chains $i$ are connected with said armor plates.

Although I have shown and described the parts $d$ and $e$ as rings, I may, if desired, substitute chains or other flexible devices for said rings, or employ rings made of chains or other flexible devices, and in this event the armor plate and attaching chains $i$ will be connected with said flexible rings in the manner shown and described or in any other suitable way.

Having fully described my invention, what I claim as new and desire to secure by Letters Patent is:—

The herein described anti-skidding and anti-puncture attachment for a vehicle wheel, comprising rings of less diameter than the wheel placed on the opposite sides thereof, the ring on the outer side of the wheel being composed of separate disconnected parts, the separate parts being provided with cross chains which are detachably secured thereto, and provided centrally thereof with turn buckle devices which are connected with the opposite part centrally thereof, the ring on the inner side of the wheel being composed of separate detachably connected parts, and armor plates adapted to be placed on the tread surface of the tire and to be connected with said rings, substantially as shown and described.

In testimony that I claim the foregoing as my invention I have signed my name in presence of the subscribing witnesses this 19th day of January, 1912.

HARRY AUPERL.

Witnesses:
C. E. MULREANY,
S. ANDREWS.